United States Patent
Hosaka et al.

(10) Patent No.: US 10,919,600 B2
(45) Date of Patent: Feb. 16, 2021

(54) MOTOR DRIVING CONTROL APPARATUS AND METHOD AND MOTOR-ASSISTED VEHICLE

(71) Applicant: TAIYO YUDEN CO., LTD., Tokyo (JP)

(72) Inventors: Yasuo Hosaka, Tokyo (JP); Hirokazu Shirakawa, Tokyo (JP); Taichi Yanaoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 205 days.

(21) Appl. No.: 16/130,597

(22) Filed: Sep. 13, 2018

(65) Prior Publication Data
US 2019/0092424 A1 Mar. 28, 2019

(30) Foreign Application Priority Data

Sep. 25, 2017 (JP) ................................ 2017-183425

(51) Int. Cl.
*B62M 6/45* (2010.01)
*B60L 7/26* (2006.01)
(Continued)

(52) U.S. Cl.
CPC ............. *B62M 6/45* (2013.01); *B60L 7/26* (2013.01); *B60T 8/1706* (2013.01); *B62D 5/0463* (2013.01); *B62M 6/65* (2013.01); *B60L 2200/12* (2013.01); *B60T 8/261* (2013.01); *B60T 8/3225* (2013.01); *B60T 2270/604* (2013.01)

(58) Field of Classification Search
CPC ... B62M 6/45; B62M 6/65; B60L 7/26; B60T 8/1706; B60T 8/3225; B62D 5/046
See application file for complete search history.

(56) References Cited

U.S. PATENT DOCUMENTS 6,247,548 B1   6/2001 Hayashi et al.
7,383,115 B2 *  6/2008 Tabata ..................... B60K 6/48
                                                   701/96

(Continued)

FOREIGN PATENT DOCUMENTS

CN        1743200 A      3/2006
CN      103287542 A      9/2013
(Continued)

OTHER PUBLICATIONS

Japanese Office Action dated Oct. 1, 2019, issued to Japanese Application No. 2017-183425.
(Continued)

*Primary Examiner* — Jacob D Knutson
*Assistant Examiner* — Michael R Stabley
(74) *Attorney, Agent, or Firm* — Stein IP, LLC

(57) ABSTRACT

A motor driving control apparatus for a motor-assisted vehicle such as a motor-assisted bicycle includes: an inverter configured to drive a motor; and a controller configured to control the inverter to start regeneration after lapse of a first time period since a second predetermined time period elapsed or gradually increase a regeneration amount, when a state that an acceleration of a vehicle on which the motor is embodied is negative and equal to or less than a first predetermined value continues for the second predetermined time period.

9 Claims, 12 Drawing Sheets

(51) Int. Cl.
*B60T 8/17* (2006.01)
*B62D 5/04* (2006.01)
*B62M 6/65* (2010.01)
*B60T 8/26* (2006.01)
*B60T 8/32* (2006.01)

(56) References Cited

U.S. PATENT DOCUMENTS

| | | | | |
|---|---|---|---|---|
| 7,702,432 | B2* | 4/2010 | Bandai | B60T 1/10 |
| | | | | 180/65.1 |
| 7,848,867 | B2* | 12/2010 | Ueno | B60K 6/48 |
| | | | | 701/70 |
| 8,160,775 | B2* | 4/2012 | Kitazaki | B60G 17/0164 |
| | | | | 280/5.52 |
| 8,577,526 | B2* | 11/2013 | Jinno | B60K 6/40 |
| | | | | 340/438 |
| 8,744,659 | B2* | 6/2014 | Yamagata | B60W 20/00 |
| | | | | 701/22 |
| 9,027,694 | B2* | 5/2015 | Matsuda | B62K 11/04 |
| | | | | 180/220 |
| 9,604,696 | B2* | 3/2017 | Miyoshi | B62M 6/50 |
| 10,137,787 | B2* | 11/2018 | Hosaka | B62M 6/90 |
| 2006/0064225 | A1 | 3/2006 | Tabata et al. | |
| 2009/0171531 | A1 | 7/2009 | Kitazaki et al. | 701/37 |
| 2014/0375115 | A1* | 12/2014 | Ajiro | B60W 10/08 |
| | | | | 303/152 |
| 2017/0129341 | A1 | 5/2017 | Hosaka et al. | |

FOREIGN PATENT DOCUMENTS

| | | |
|---|---|---|
| EP | 2 868 562 A1 | 5/2015 |
| EP | 3025898 A1 | 6/2016 |
| JP | H10-035576 A | 2/1998 |
| JP | 2002-145168 A | 5/2002 |
| JP | 2004-245045 A | 9/2004 |
| JP | 2004-278317 A | 10/2004 |
| JP | 2009-154674 A | 7/2009 |
| JP | 2010-35376 A | 2/2010 |
| JP | 2012-213301 A | 11/2012 |
| JP | 5666639 B2 | 2/2015 |
| JP | 2015-109798 A | 6/2015 |
| JP | 2016-8004 A | 1/2016 |
| JP | 2016-020113 A | 2/2016 |
| JP | 2016-150684 A | 8/2016 |
| JP | 2016-168894 A | 9/2016 |
| KR | 10-2011-0033622 A | 3/2011 |
| WO | 2014/003017 A1 | 1/2014 |
| WO | 2014/050474 A1 | 4/2014 |

OTHER PUBLICATIONS

European Office Action dated Mar. 17, 2020 to European Application No. 18193385.4.

European Search Report dated Feb. 21, 2019, in a counterpart European patent application No. 18193385.4.

Taiwanese Office Action dated Feb. 26, 2019, in a counterpart Taiwanese patent application No. 107127396. (A partial translation is attached as a concise explanation of relevance.).

* cited by examiner

MOTOR DRIVING CONTROL APPARATUS AND METHOD AND MOTOR-ASSISTED VEHICLE

CROSS-REFERENCE TO RELATED APPLICATIONS

This application is based upon and claims the benefit of priorities of the prior Japanese Patent Applications No. 2017-183425, filed on Sep. 25, 2017, the entire contents of which are incorporated herein by reference.

FIELD

This invention relates to a motor driving control apparatus and a motor-assisted vehicle having the motor driving control apparatus.

BACKGROUND

A certain document discloses an e-bicycle that has a brake sensor and performs the regeneration when a brake operation is detected by the brake sensor. However, although the brake sensor is relatively expensive, the driver not always operates the brake so that the brake sensor appropriately detects the brake operation. Therefore, there is a case where the regeneration is not performed effectively.

In addition, another document discloses a mobile equipment with an auxiliary power unit that start the regeneration when the acceleration is equal to or greater than a predetermined value. However, the predetermined value is only determined in relation to the velocity, and any problems that, for example, occurs due to the road state are not considered.

Patent Document 1: WO2014/003017
Patent Document 2: Japanese Laid-open Patent Publication No. 2010-35376

Namely, there is no technique for enabling automatic start of the regeneration at an appropriate timing.

SUMMARY

A motor driving control apparatus relating to this invention includes (A) a driving unit configured to drive a motor; and (B) a controller configured to control the driving unit to perform regeneration when an acceleration of a vehicle on which the motor is embodied is negative and equal to or greater than a predetermined value.

DESCRIPTION OF EMBODIMENTS

In the following, embodiments of this invention will be explained for, as one example, a motor-assisted bicycle that is an example of a motor-assisted vehicle. However, an application target of the embodiment of this invention is not limited to the motor-assisted bicycle, and the embodiments can be applied to a motor driving control apparatus for a motor or the like to assist the movement of a mobile object (e.g. a hand truck, wheel chair, lift or the like) that moves according to a human power. According to circumstances, the embodiments may be applied to a simple electric-powered vehicle that does not assist the human power.

Embodiment 1

Figure 1:
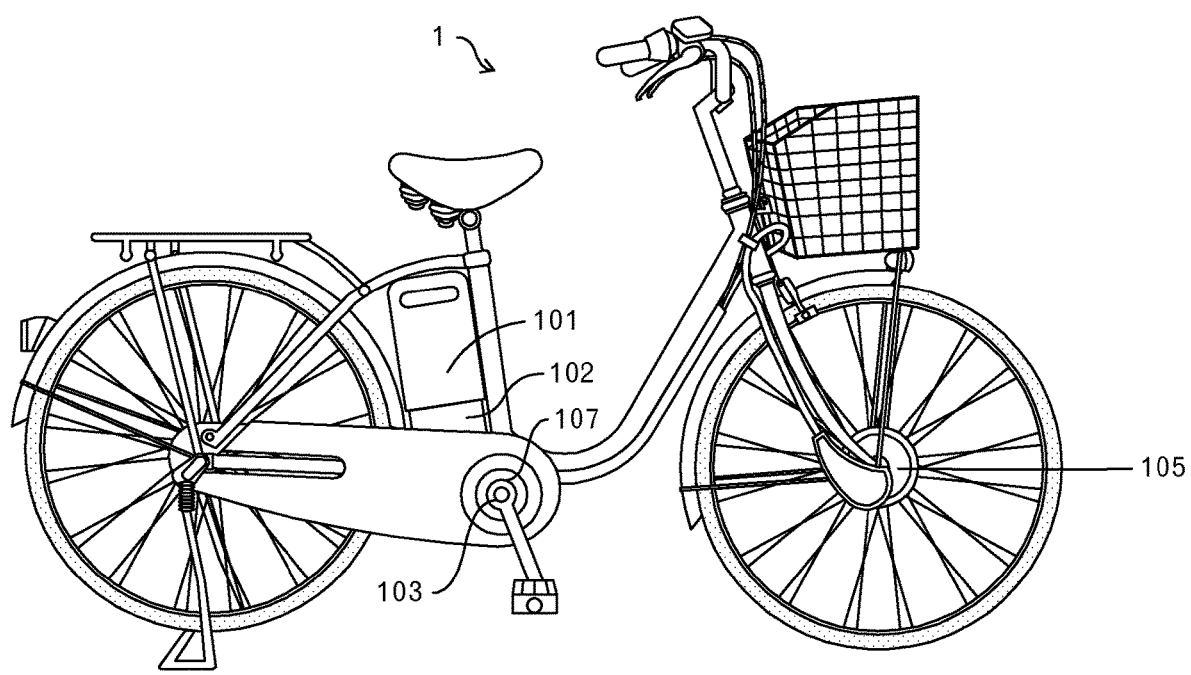
FIG. 1 is an outline diagram of a motor-assisted bicycle relating to embodiments.

FIG. 1 illustrates an external view depicting an example of a motor-assisted bicycle in this embodiment. This motor-assisted bicycle 1 is a typical rear-driving type of motor-assisted bicycle in which the crankshaft is coupled with the rear wheel through the chain.

Then, the motor-assisted bicycle 1 is equipped with a motor driving apparatus. The motor driving apparatus has a rechargeable battery 101, a motor driving control apparatus 102, a torque sensor 103, a pedal rotation sensor 107 and a motor 105. In this embodiment, a brake sensor is not used.

The rechargeable battery 101 is, for example, a lithium-ion rechargeable battery, however, may be another kind of battery such as a lithium-ion polymer rechargeable battery, or a nickel-hydrogen battery.

The torque sensor 103 is provided in a wheel, which is installed in the crankshaft, detects a pedal force from the rider, and outputs this detection result to the motor driving control apparatus 102. Similarly, the pedal rotation sensor 107 is provided in the wheel, which is installed in the crankshaft, detects rotations of pedals by the rider, and outputs the detection result to the motor driving control apparatus 102.

The motor 105 is, for example, a well-known in-wheel motor, and installed in the front wheel of the motor-assisted bicycle 1. The motor 105 rotates the front wheel, and also a rotor is connected to the front wheel so as to rotate according to the rotation of the front wheel. Furthermore, the motor 105 is equipped with a rotation sensor such as a hall sensor to output the rotation information (i.e. a hall signal) of the rotor to the motor 105.

Other sensors and control panel are provided in the motor-assisted bicycle 1 and output of those are inputted into the motor driving control apparatus 102. The control panel has a power switch, a selection switch of assist modes and a display device such as Light Emitting Diodes (LEDs). In addition, the motor-assisted bicycle 1 also has a transmission and freewheel.

Figure 2:
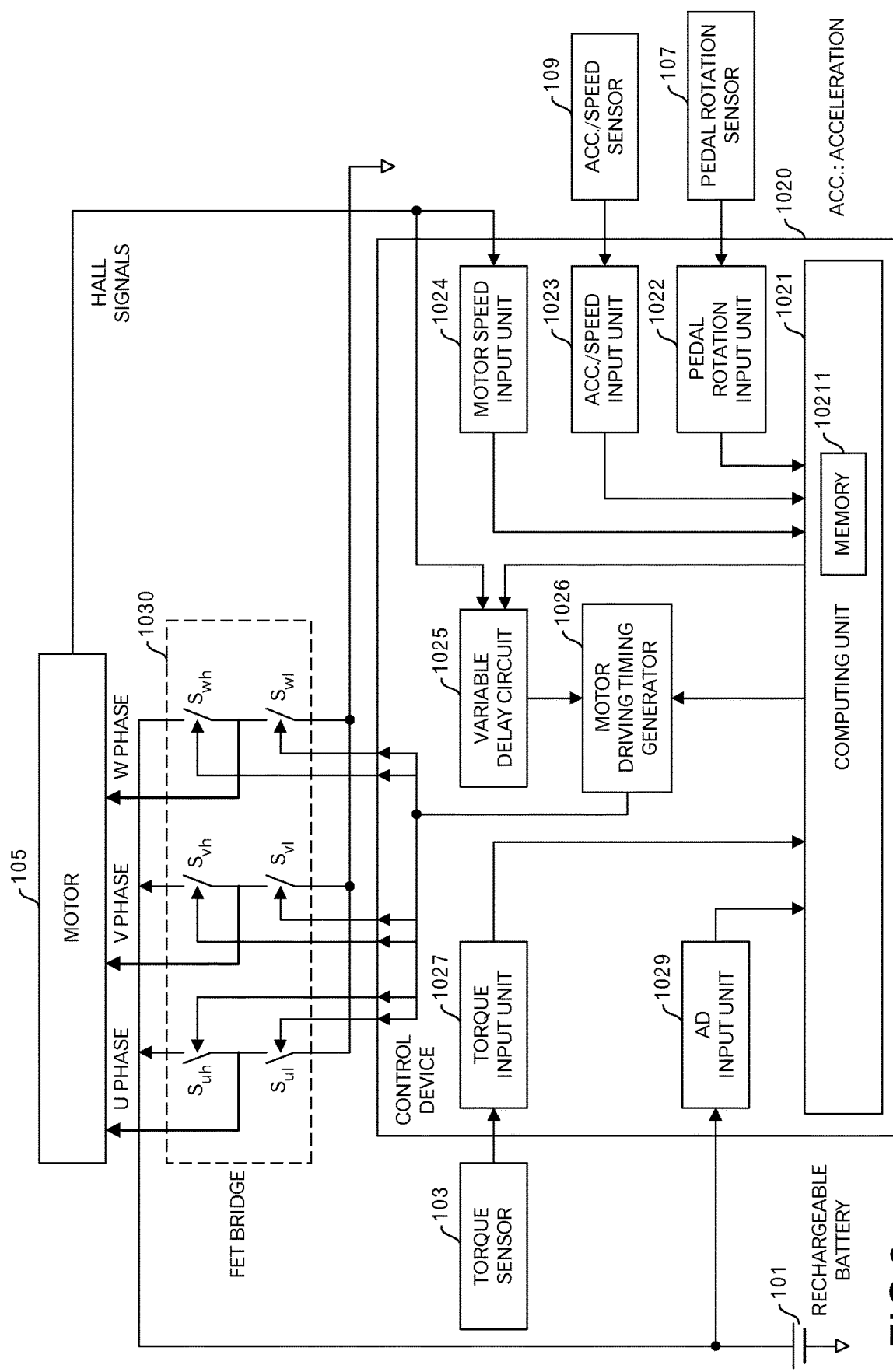
FIG. 2 is a functional block diagram of a motor driving control apparatus relating to the embodiments.

FIG. 2 illustrates a configuration related to the motor driving control apparatus 102 of this motor-assisted bicycle 1. The motor driving control apparatus 102 includes a control device 1020, and a FET (Field Effect Transistor) bridge 1030. The FET bridge 1030 includes a high side FET (Suh) and a low side FET (Sul) to perform switching of a U phase of the motor 105, a high side FET (Svh) and a low side FET (Svl) to perform switching of a V phase of the motor 105, and a high side FET (Swh) and a low side FET (Swl) to perform switching of a W phase of the motor 105. This FET bridge 1030 is configured as a portion of the complementary type switching amplifier, and also configured as at least portion of the driving unit of the motor 105.

Moreover, the control device 1020 has a computing unit 1021, a pedal rotation input unit 1022, a motor speed input unit 1024, a variable delay circuit 1025, a motor driving timing generator 1026, a torque input unit 1027, and an Analog-Digital (AD) input unit 1029. According to circumstances, the motor-assisted bicycle 1 is equipped with an accelerator or speed sensor, and a signal representing the acceleration or speed of the motor-assisted bicycle 1 may be inputted to the acceleration/speed input unit 1023 in the control device 1020.

The computing unit 1021 performs computation using an input from the motor speed input unit 1024, an input from the torque input unit 1027, an input from the pedal rotation input unit 1022, an input from the AD input unit 1029 and the like, and outputs results of the computation to the motor driving timing generator 1026 and the variable delay circuit 1025. The computing unit 1021 has a memory 10211, and the memory 10211 stores various data used for the computation, data during processing and the like. Furthermore, the computing unit 1021 may be realized by executing, by a processor, programs, and in such a case, the programs may be recorded in the memory 10211. Moreover, the memory 10211 may be provided, separately from the computing unit 1021.

The motor speed input unit 1024 calculates a motor speed or the like from the hall signal outputted by the motor 105, and outputs the motor speed or the like to the computing unit 1021. The torque input unit 1027 digitizes a signal corresponding to a pedal force from the torque sensor 103, and outputs the pedal torque to the computing unit 1021. The AD input unit 1029 digitizes an output voltage from the rechargeable battery 101 to the digitized output voltage to the computing unit 1021. The pedal rotation input unit 1022 converts a signal corresponding to the pedal rotation angle into a pedal rotation angle, for example, and outputs the pedal rotation angle to the computing unit 1021. When the acceleration/speed sensor 109 is provided, the acceleration/speed input unit 1023 converts a signal corresponding to the acceleration/speed from the acceleration/speed sensor 109 into the acceleration/speed, and outputs the acceleration/speed to the computing unit 1021.

The computing unit 1021 outputs, as a computing result, a lead angle to the variable delay circuit 1025. The variable delay circuit 1025 adjusts a phase of the hall signal based on the lead angle received from the computing unit 1021, and outputs the adjusted phase to the motor driving timing generator 1026. The computing unit 1021 outputs a PWM (Pulse Width Modulation) code corresponding to a duty cycle of the PWM, for example, as the computing result, to the motor driving timing generator 1026. The motor driving timing generator 1026 generates and outputs switching signals for the respective FETs included in the FET bridges 1030, based on the adjusted hall signal from the variable delay circuit 1025 and the PWM code from the computing unit 1021.

The computing unit 1021 performs computation so that the FET bridges 1030 causes the motor 105 to appropriately perform the power driving or regenerative braking, however, the details of the computation is not a main portion of this application, and its explanation is omitted.

Figure 3:
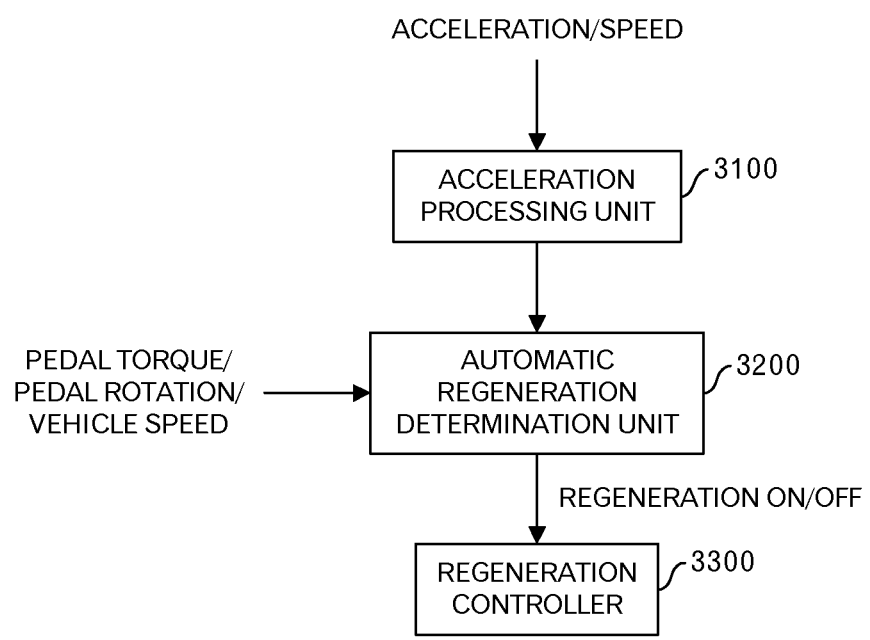
FIG. 3 is a functional block diagram of a controller relating the embodiments.

FIG. 3 illustrates a functional block diagram of a controller to perform the control relating to this embodiment. The controller realized in the computing unit 1021 has an acceleration processing unit 3100, an automatic regeneration determination unit 3200 and a regeneration controller 3300.

When data of the speed is used, the acceleration processing unit 3100 calculates the acceleration from the data of the speed and performs a predetermined smoothing processing for the acceleration. For example, the motor speed from the motor speed input unit 1024 may be used as a speed of the vehicle, and when the acceleration/speed sensor 109 is a speed sensor, the speed inputted from the acceleration/speed input unit 1023 may be used as the speed of the vehicle.

When the hall signal from the hall sensor provided in the motor 105 is used, functions described below can be realized with a low cost without additionally providing any dedicated speed sensor or acceleration sensor.

The smoothing is performed in order to remove noise components that occur according to the road state on which the motor-assisted bicycle 1 runs, and it is realized by a simple moving average, a special moving average (e.g. an average value of four measurement values among six measurement value by removing the maximum value and the minimum value) or smoothing by using a predetermined low pass filter.

The acceleration processing unit 3100 smooths the acceleration in case where data of the acceleration is used. For example, in case where the acceleration/speed sensor 109 is an acceleration sensor, the acceleration inputted from the acceleration/speed input unit 1023 is used as the acceleration of the vehicle.

The automatic regeneration determination unit 3200 determines the start or end of the automatic regeneration, based on the smoothed acceleration outputted from the acceleration processing unit 3100. In other embodiments, the automatic regeneration determination unit 3200 performs processing further based on the pedal torque inputted from the torque input unit 1027, the pedal rotation angle inputted from the pedal rotation input unit 1022, the vehicle speed from the motor speed input unit 1024 and the like.

The regeneration controller 3300 determines the regeneration amount in response to the output from the automatic regeneration determination unit 3200, if the regeneration is performed, and controls the motor 105 to generate the regeneration amount. For example, when the regeneration is performed, the regeneration amount is determined based on the speed of the vehicle, the acceleration, the pedal rotation speed and/or like. The calculation method of the regeneration amount is not a main portion of this embodiment. Therefore, the detailed explanation for the calculation method is omitted. Although it is explained in detail later, a control method to enable the determined regeneration amount after a predetermined time period, or a control method to gradually increase the regeneration amount to the determined regeneration amount may be employed.

Next, an operation flow of the controller depicted in FIG. 3 will be explained by using FIGS. 4 to 7.

Figure 4:
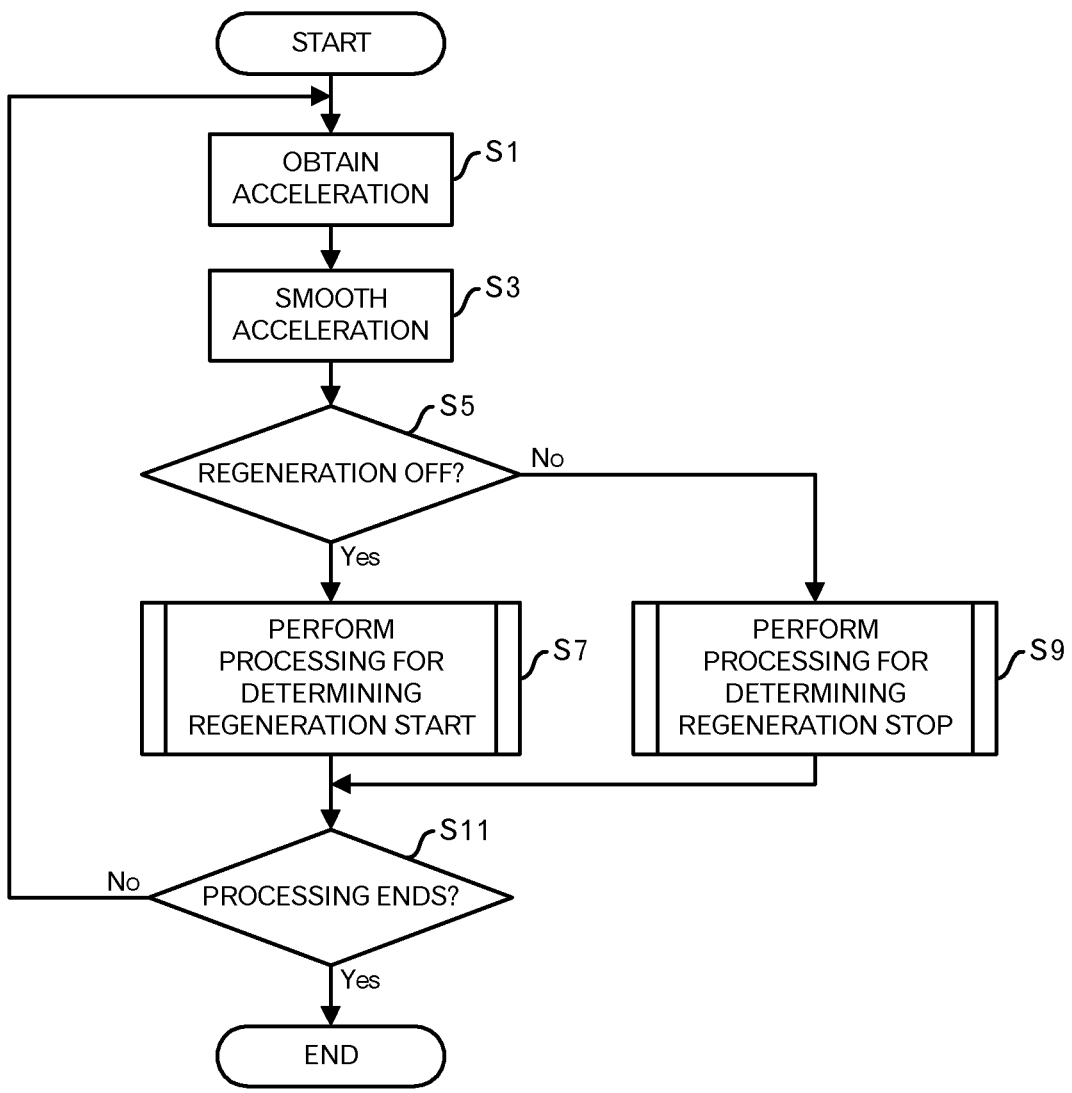
FIG. 4 is a diagram depicting a processing flow relating to a first embodiment.

The acceleration processing unit 3100 obtains the acceleration (step S1 in FIG. 4). When data of the speed is obtained, the acceleration is calculated as the amount of change of the speeds. When the acceleration is inputted, the inputted acceleration is used.

Next, the acceleration processing unit 3100 performs the smoothing processing for the obtained acceleration, and outputs the smoothed acceleration to the automatic regeneration determination unit 3200 (step S3). As described above, the smoothing is performed by the moving average or low pass filter. A predetermined number of smoothed accelerations are stored in the memory 10211.

The automatic regeneration determination unit 3200 determines whether or not the regeneration is OFF (namely, a regeneration flag is OFF) now (step S5). The regeneration flag is set in a predetermined area of the memory 10211, for example.

When the regeneration is OFF now, the automatic regeneration determination unit 3200 performs a processing for determining the regeneration start (step S7). The processing for determining the regeneration start will be explained by using FIG. 5. After the processing for determining the regeneration start, the processing shifts to step S11.

On the other hand, when the regeneration is ON now (namely, the regeneration flag is ON), the automatic regeneration determination unit 3200 performs a processing for determining the regeneration stop (step S9). The processing for determining the regeneration stop will be explained by using FIG. 6. After the processing for determining the regeneration stop, the processing shifts to the step S11.

The aforementioned processing is repeated at intervals of a predetermined time period until the power supply to the motor driving control apparatus 102 is turned OFF, for example, and the processing ends (step S11). In other words, when the processing does not end, the processing returns to step S1, and when the power supply is turned OFF, the processing ends.

Figure 5:
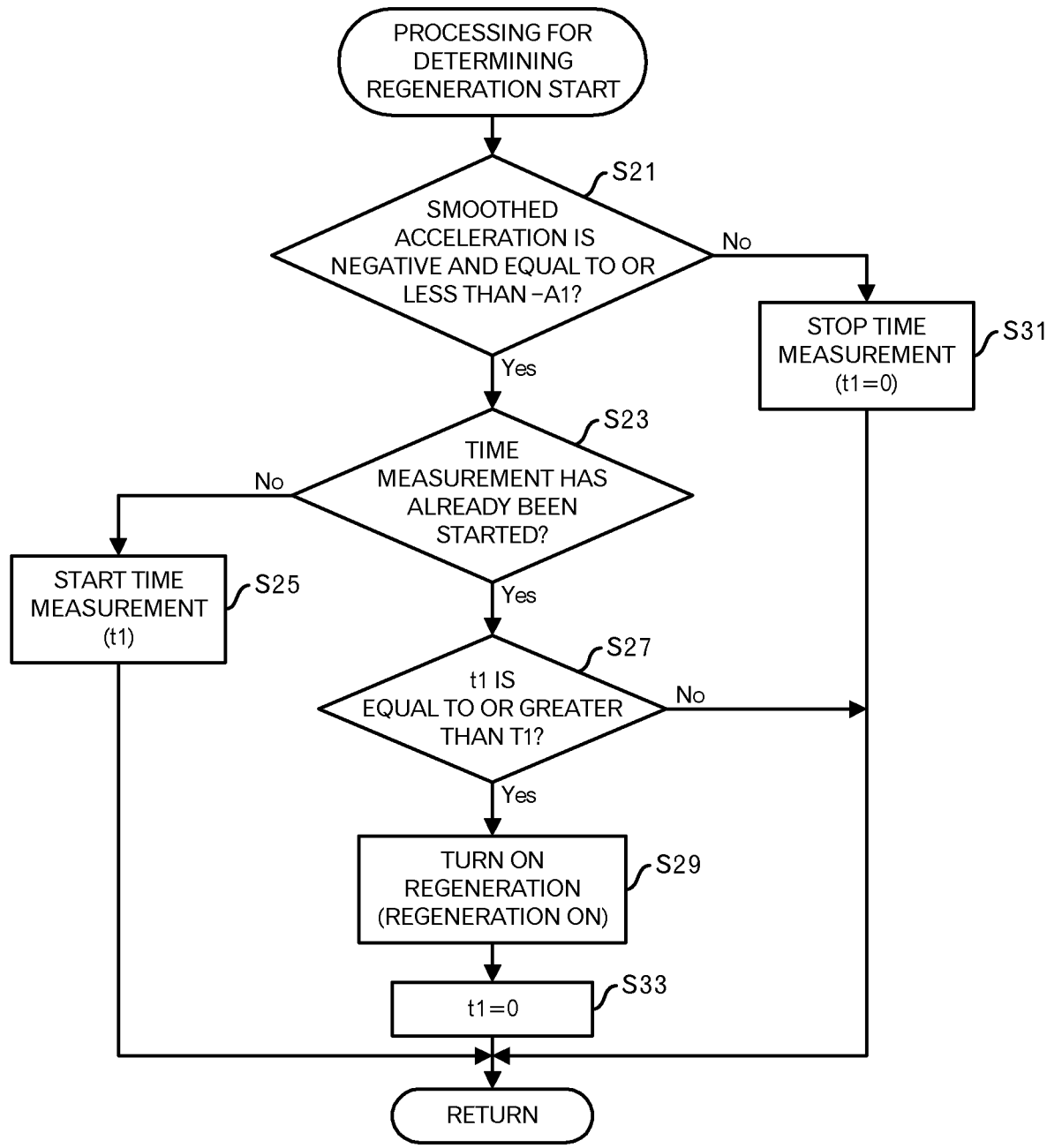
FIG. 5 is a diagram depicting a processing flow of a processing for determining regeneration start.

Next, the processing for determining the regeneration start is explained by using FIG. 5.

The automatic regeneration determination unit 3200 determines whether or not the smoothed acceleration is negative and equal to or less than a threshold "−A1" (A1 is a positive value) (step S21). A1 is set as a threshold set based on a negative acceleration, which occurs due to functioning of the mechanical brake. In other words, when the mechanical brake functions, at least acceleration whose absolute value is equal to or greater than A1 occurs in a negative direction. Accordingly, the functioning of the mechanical brake can be detected.

When the smoothed acceleration is negative and equal to or less than the threshold "−A1" and the time measurement has not been started (step S23: No route), the time measurement is started (step S25). t1 denotes the measured time. Then, the processing returns to a calling source processing. On the other hand, when the time measurement has already been started (step S23: Yes route), the automatic regeneration determination unit 3200 determines whether or not t1 is equal to or longer than a predetermined time period T1 (step S27). When t1 is shorter than the predetermined time period T1, the processing returns to the calling source processing because there is a possibility that the negative acceleration is not caused by the functioning of the mechanical brake. For example, in case where the normal mechanical brake is used when the motor-assisted bicycle 1 stops at the signal, the user continues to brake for some seconds until the motor-assisted bicycle 1 completely stops. Under such assumption, for example, 0.5 seconds are set as T1. In other words, when the braking continues for 0.5 seconds or longer, it is determined that the possibility of the functioning of the mechanical brake is high, instead of the noise, which occurs according to the road state or the like.

On the other hand, when t1 is equal to or longer than T1, the automatic regeneration determination unit 3200 sets ON for the regeneration ON (namely, ON for the regeneration flag) (step S29). In response to this, the regeneration controller 3300 calculates the regeneration amount to perform control so as to cause the motor 105 to generate the regeneration amount. In addition, the automatic regeneration determination unit 3200 stops the time measurement (step S33). In other words, t1=0 is set. After that, the processing returns to the calling source processing.

When it is determined at the step S21 that the smoothed acceleration exceeds the threshold "−A1", the automatic regeneration determination unit 3200 stops the time measurement (step S31). Namely, t1=0 is set. When the time measurement has not been started, this step may be skipped. Then, the processing returns to the calling source processing.

By performing the aforementioned processing, it becomes possible to detect the functioning of the mechanical brake based on whether or not the negative acceleration that is equal to or less than the threshold "−A1" continues for the predetermined time period T1 or longer, and instruct the start of the regeneration at an appropriate timing.

Figure 6:
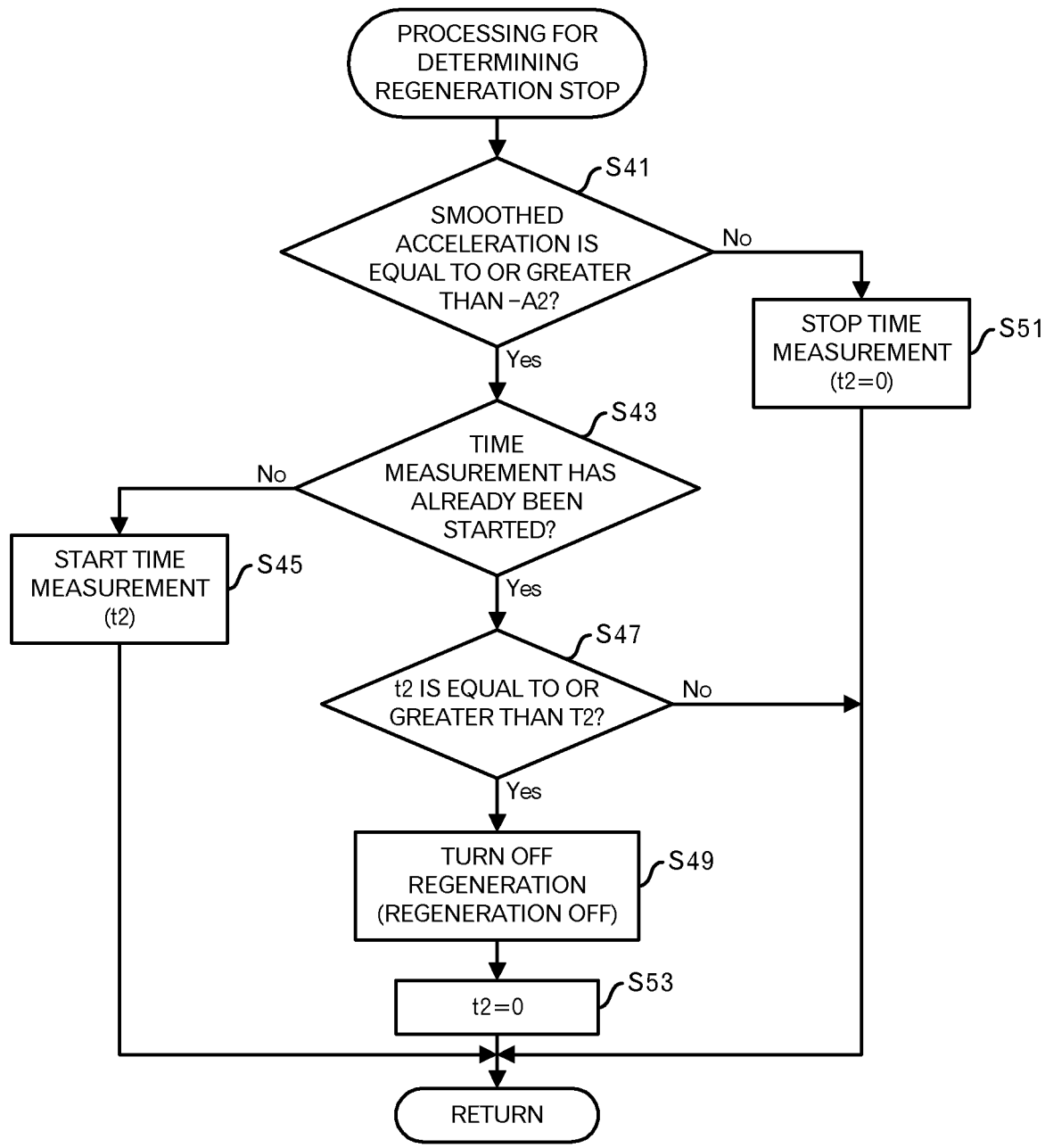
FIG. 6 is a diagram depicting a processing flow of a processing for determining regeneration stop.

Next, the processing for determining the regeneration stop is explained by using FIG. 6.

The automatic regeneration determination unit 3200 determines whether or not the smoothed acceleration is equal or greater than a threshold "−A2" (A2 is a positive value) (step S41). A2 is a threshold set for detecting the end of the functioning of the mechanical brake. For example, A1 is greater than A2, and even when the negative acceleration is detected, this step detects a case where the acceleration increases.

When the smoothed acceleration is equal to or greater than the threshold "−A2" and the time measurement has not been started (step S43: No route), the time measurement is started (step S45). t2 denotes the time to be measured. Then, the processing returns to the calling-source processing. On the other hand, when the time measurement has already been started (step S43: Yes route), the automatic regeneration determination unit 3200 determines whether or not t2 is equal to or greater than a predetermined time period T2 (step S47). When t2 is less than the predetermined time period T2, the processing returns to the calling-source processing because there is a possibility that it is not the functioning stop of the mechanical brake even when the smoothed acceleration satisfies the condition.

Different from the functioning start of the mechanical brake, T2 is shorter than T1, because it is not preferable that the regeneration unnaturally continues. For example, 0.3 seconds is set for T2. By this setting, the stop of the regeneration by the noise is prevented.

On the other hand, when t2 is equal to or greater than T2, the automatic regeneration determination unit 3200 sets regeneration OFF (namely, OFF is set for the regeneration flag.) (step S49). Accordingly, the regeneration controller 3300 controls the motor 105 to stop the regeneration. In addition, the automatic regeneration determination unit 3200 stops the time measurement (step S53). Namely, t2=0 is set. After that, the processing returns to the calling-source processing.

When it is determined at the step S41 that the smoothed acceleration is less than the threshold "−A2", the automatic regeneration determination unit 3200 stops the time measurement (step S51). Namely, t2=0 is set. When the time measurement has not been started, this step may be skipped. Then, the processing returns to the calling-source processing.

By performing the aforementioned processing, it becomes possible to detect the functioning stop of the mechanical brake based on whether or not the acceleration that is equal to or greater than the threshold "−A2" continues the predetermined time period T2 or longer, and instructs to stop the regeneration.

Figure 7:
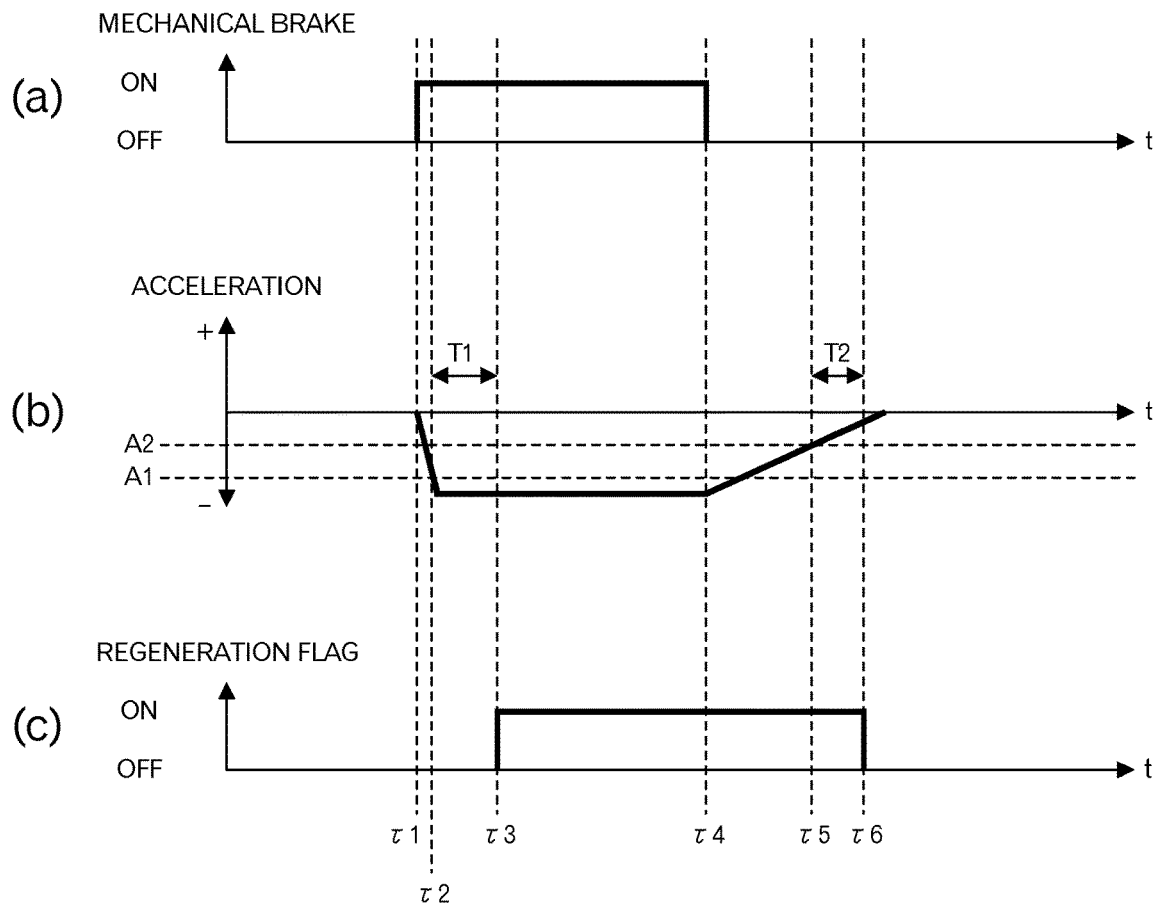
FIG. 7 is a time chart depicting an operational example relating to the first embodiment.

FIG. 7 illustrates an operational example in this embodiment. The horizontal axis in FIG. 7 represents the time, and (a) represents ON or OFF of the mechanical brake, (b) represents the smoothed acceleration and (c) represents ON or OFF of the regeneration flag.

For example, at time τ1, when the mechanical brake becomes ON, the acceleration starts to decrease and becomes equal to or less than the threshold "−A1" at time τ2. Then, the measurement of the time t1 starts, and a state that the acceleration is equal to or less than "−A1" is kept until time τ3. At time τ3, t1=T1 is held. Therefore, at time τ3, the regeneration flag becomes ON.

After that, at time τ4, the mechanical brake becomes OFF, and the acceleration increases. However, the acceleration does not reach "−A2" until time τ5. Namely, even at time τ5, ON of the regeneration flag is kept, and the regeneration continues. However, the time t2 is measured since time τ5, and a state that the acceleration is equal to or less than the threshold "−A2" is maintained until time τ6 (the time t2 reaches T2). Therefore, at time τ6, the regeneration flag becomes OFF. Namely, the regeneration stops.

By performing the aforementioned processing, it becomes possible to appropriately detect the functioning of the mechanical brake to perform the regeneration automatically, without using the brake sensor. In other words, while reducing the cost, the chance of the regeneration can be increased, and the extension of the running range can be realized.

Embodiment 2

In the first embodiment, after a condition is satisfied that a state that the smoothed acceleration is equal to or less than the threshold continues for the predetermined time period or longer, ON is set for the regeneration flag soon, and the regeneration controller 3300 controls the regeneration by a predetermined regeneration amount in response to that. In such a case, the regeneration is performed soon, and the entire regeneration time period becomes long. Therefore, the charging amount also increases.

However, the speed change is assumed after the aforementioned condition is satisfied, and the balance of the rider may not be stable. The work of the regeneration in such a state may cause the rider to feel strange. Then, for example, the start of the regeneration may be postponed after the lapse of the time period T3 (>0) since the aforementioned condition is satisfied.

In addition, by gradually increasing the regeneration amount since the aforementioned condition is satisfied (i.e. after the regeneration flag becomes ON), it becomes possible to reduce the uncomfortable feeling or the like.

Figure 8:
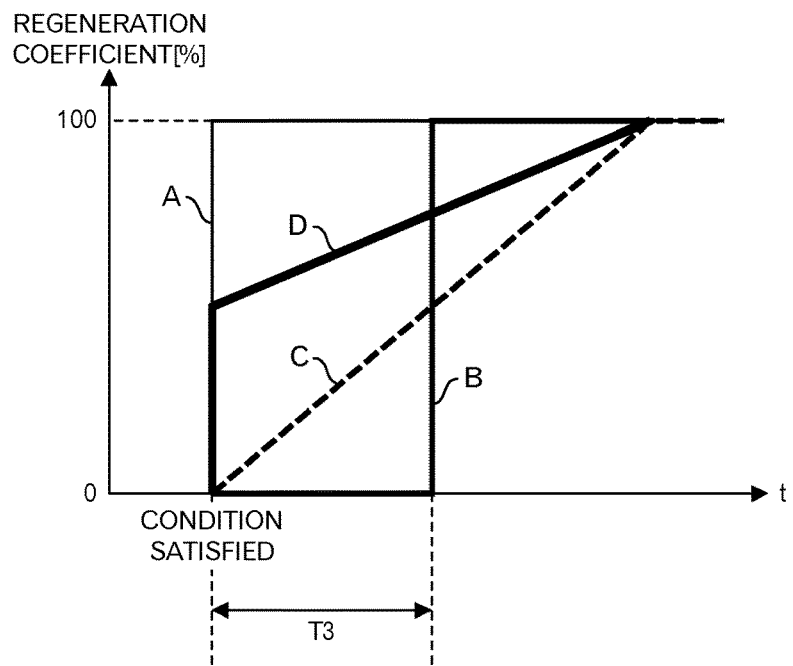
FIG. 8 is a diagram depicting a temporal change of a regenerative coefficient relating to a second embodiment.

Such control is explained by using FIG. 8. The horizontal axis of FIG. 8 represents the time, and the vertical axis represents a regeneration coefficient [%]. For example, a value obtained by multiplying the regeneration amount calculated by the regeneration controller 3300 with the regeneration coefficient represents the regeneration amount to be generated at that timing.

The solid line A represents an example of the first embodiment. In other words, the regeneration coefficient becomes 100% soon when the aforementioned condition is satisfied, and the large regeneration amount is generated soon.

The solid line B illustrates an example that the predetermined regeneration amount is generated after the time period T3 elapsed. In other words, after the time period T3, the regeneration coefficient becomes 100%, and this reduces the uncomfortable feelings or the like.

The dotted line C represents an example that the regeneration coefficient linearly increases after the aforementioned condition is satisfied. In other words, because the regeneration amount gradually increases, the uncomfortable feeling of the rider can be reduced. Furthermore, the thick line D represents an example that the regeneration coefficient increases up to 50% or the like soon after the aforementioned condition is satisfied, however, after that the regeneration coefficient increases linearly. By employing such a curve, it is possible to reduce the uncomfortable feeling while the regeneration amount is kept to some extent. However, instead of the linear increase, the exponential increase may be employed, and the gradual increase along other functions may be employed.

Also, when the regeneration flag becomes OFF, the regeneration may be gradually decreased or may be suppressed instead of the immediate stop of the regeneration.

Embodiment 3

In the first embodiment, the condition A2<A1, namely −A2>−A1, was explained.

On the other hand, because the regenerative braking also generates a negative acceleration, it is preferable that "A2" is set by taking into consideration the negative acceleration caused by the regenerative braking.

More specifically, when the negative acceleration caused by the regenerative braking is assumed as −A3 (i.e. A3 is a positive value), it is preferable that −A3>−A2 and A3<A2 is satisfied. The difference between A2 and A3 is set while taking into account the noise. When −A3<−A2 is set, there is a case where the regeneration stop cannot be performed.

An operational example in case where the threshold "−A2" as described above is set is explained by using FIG. 9.

Figure 9:
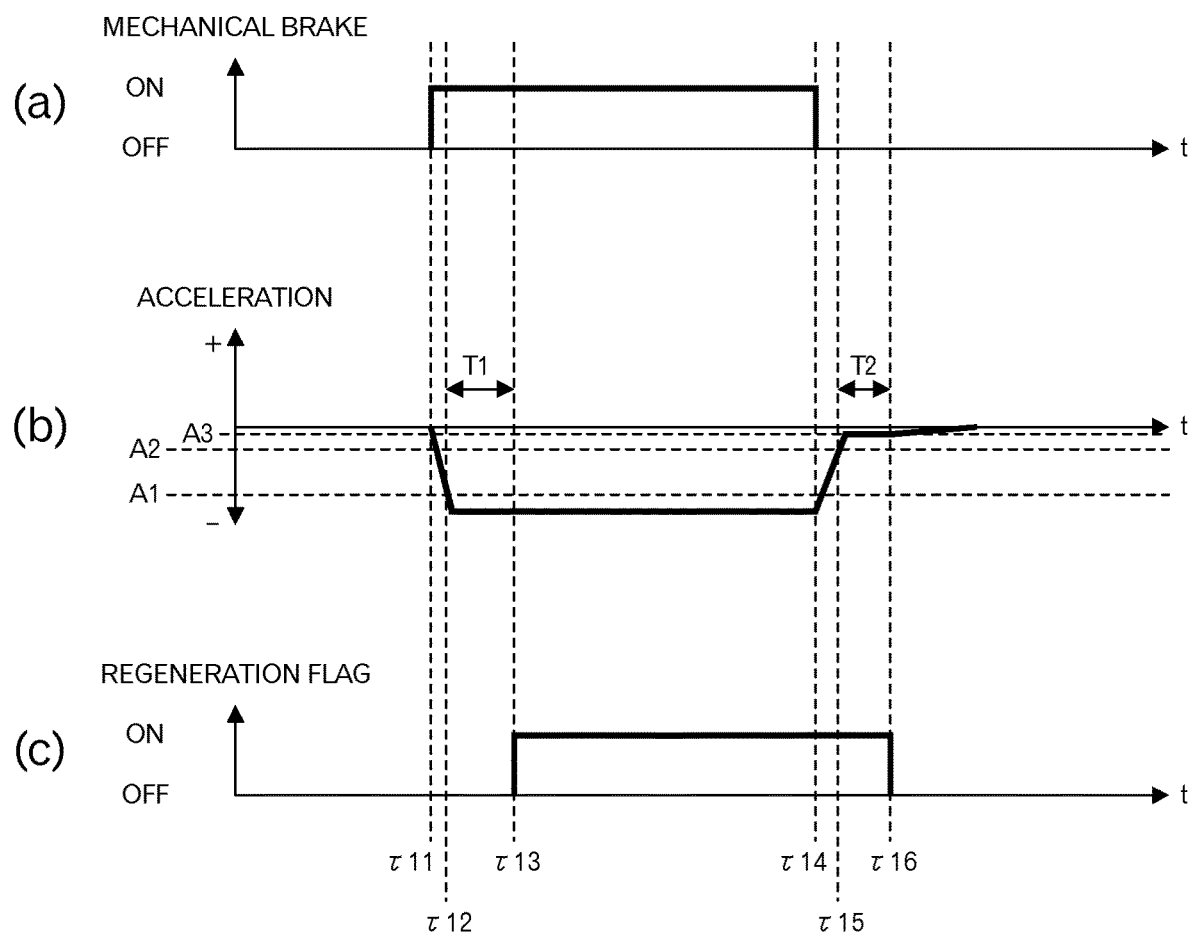
FIG. 9 is a time chart depicting an operational example relating to a third embodiment.

The horizontal axis of FIG. 9 represents the time, (a) represents ON or OFF of the mechanical brake, (b) represents the smoothed acceleration, and (c) represents ON or OFF of the regeneration flag.

For example, when the mechanical brake becomes ON at time τ11, the acceleration begins to decrease, and at time τ12, the acceleration becomes equal to or less than the threshold "−A1". Then, the measurement of the time t1 is started, and a state that the acceleration is kept being equal to or less than "−A1" is maintained until time τ13 at which t1=T1 is held. Therefore, at time τ13, the regeneration flag becomes ON.

After that, at time τ14, the mechanical brake becomes OFF, therefore, the acceleration increases. However, in this example, the acceleration rapidly increases, and at time τ15, the acceleration reaches "−A2". As described above −A2<−A3 is held. Then, the measurement of the time t2 is started.

However, when the regenerative brake is effective on and after time τ15, the negative acceleration about −A3 might continue.

Therefore, the time period T2 elapsed since time τ15, and it becomes time τ16. Then, the regeneration flag becomes OFF and the regeneration is stopped. Because the motor-assisted bicycle 1 stops, the acceleration becomes about zero.

By appropriately setting the threshold like this, it becomes possible to stop the regeneration at an appropriate timing.

Embodiment 4

When the rider performs any operation for acceleration even during the regeneration, it is inappropriate to continue the regeneration. Therefore, in this embodiment, in order to handle the rider's intention of the acceleration, a case where the pedal torque becomes equal to or greater than a predetermined value or a case where the pedal rotation angle becomes equal to or greater than a predetermined angle is assumed. However, when there are any other operations to detect the rider's intention of the acceleration, any other operations may be employed.

Figure 10:
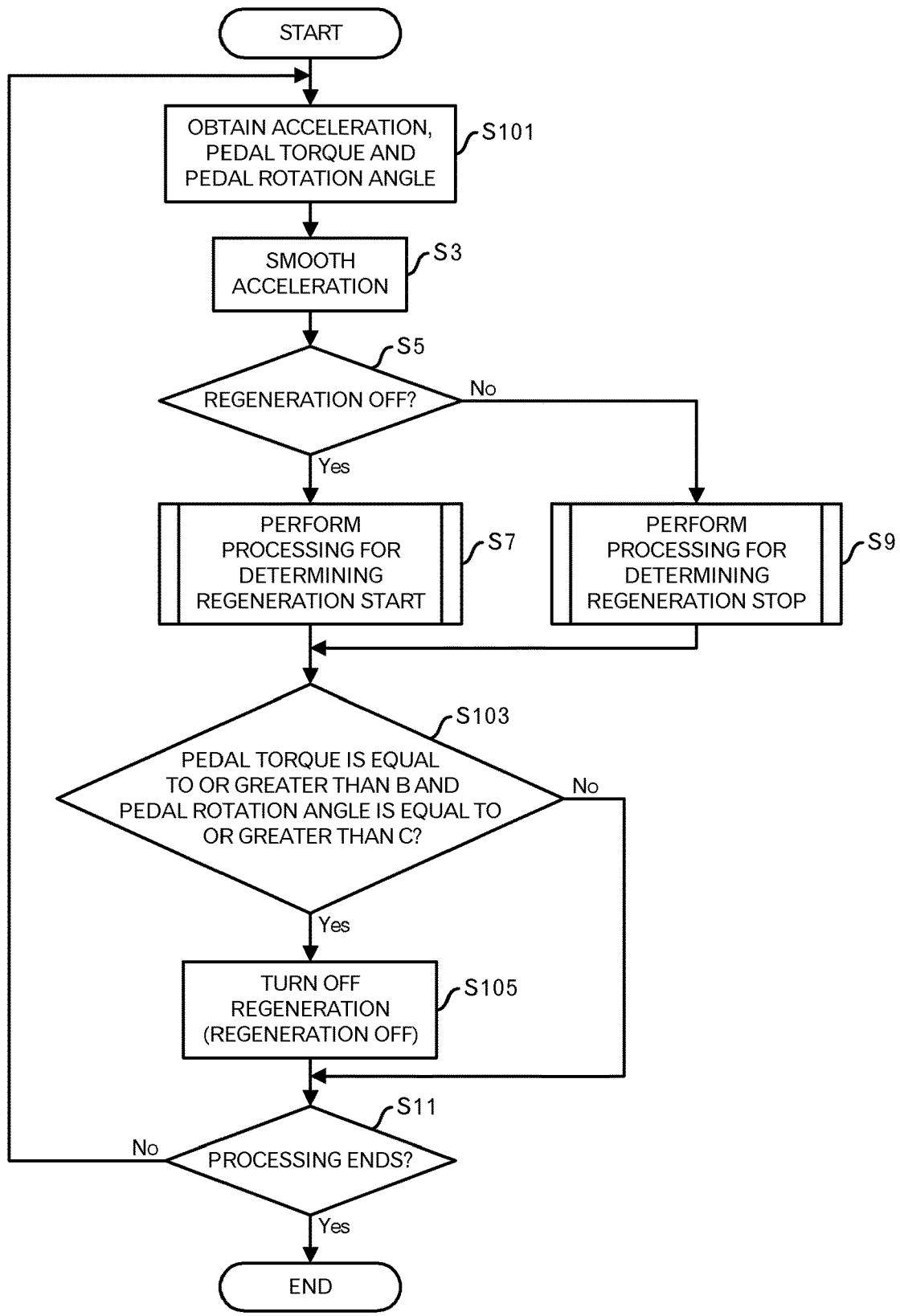
FIG. 10 is a diagram depicting a processing flow relating to a fourth embodiment.

FIG. 10 depicts an operational flow of the controller relating to this embodiment. As for the same processing as FIG. 4, the same step number is assigned.

Firstly, the acceleration processing unit 3100 obtains the acceleration, and the automatic regeneration determination unit 3200 obtains the pedal torque and the pedal rotation angle (step S101 in FIG. 10). The processing contents of the acceleration processing unit 3100 are the same as the step S1 in FIG. 4. Therefore, the explanation is omitted here.

The automatic regeneration determination unit 3200 obtains the pedal rotation angle from the pedal rotation input unit 1022 and the pedal torque from the torque input unit 1027.

Next, the acceleration processing unit 3100 performs the smoothing processing for the obtained acceleration, and outputs the smoothed acceleration to the automatic regeneration determination unit 3200 (step S3).

The automatic regeneration determination unit 3200 determines whether or not the regeneration is ON now (namely, the regeneration flag is ON) (step S5).

When the regeneration is OFF now, the automatic regeneration determination unit 3200 performs the processing for determining the regeneration start (step S7). The processing for determining the regeneration start was depicted in FIG. 5. After the processing for determining the regeneration start, the processing shifts to step S103.

On the other hand, when the regeneration is ON now (namely, the regeneration flag is ON), the automatic regeneration determination unit 3200 performs the processing for determining the regeneration stop (step S9). The processing for determining the regeneration stop was depicted in FIG. 6. After the processing for determining the regeneration stop, the processing shifts to the step S103.

The processing from the step S3 to the step S9 is the same as FIG. 4.

Then, the automatic regeneration determination unit 3200 determines whether or not the pedal torque is equal to or greater than a threshold B or the pedal rotation angle is equal to or greater than a threshold C (step S103). As described above, it is determined whether or not the rider's intention of the acceleration was detected.

When the pedal torque is less than the threshold B and the pedal rotation angle is less than the threshold C, the processing shifts to the step S11 because no rider's intention of the acceleration is detected.

On the other hand, when the pedal torque is equal to or greater than the threshold B or the pedal rotation angle is equal to or greater than the threshold C, the automatic regeneration determination unit 3200 sets the regeneration OFF (i.e. OFF is set for the regeneration flag) (step S105). When the regeneration flag is OFF, previously, the steps S103 to S105 may be skipped.

This processing is repeated at intervals of a predetermined time period until the power supply to the motor driving control apparatus 102 is stopped, for example, and the processing ends (step S11). Namely, when the processing does not end, the processing returns to the step S101, and when the power supply is turned OFF, the processing ends.

By the aforementioned processing, it becomes possible to stop the regeneration when the intention of the acceleration is detected.

Figure 11:
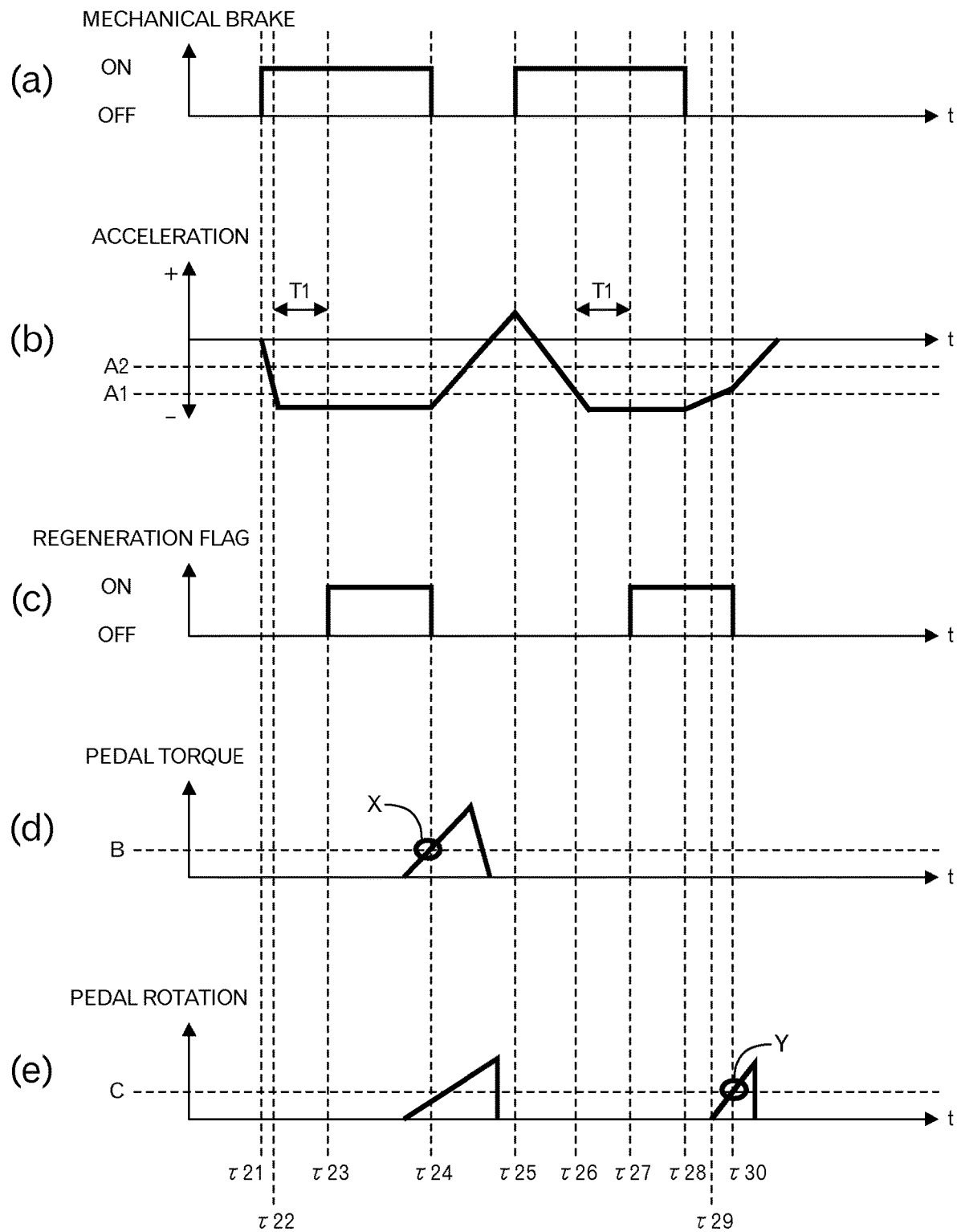
FIG. 11 is a time chart depicting an operational example relating to the fourth example.

FIG. 11 depicts an operational example relating to this embodiment.

The horizontal axis of FIG. 11 represents the time, (a) represents ON or OFF of the mechanical brake, (b) represents the smoothed acceleration, (c) represents ON or OFF of the regeneration flag, (d) represents the pedal torque, and (e) represents the pedal rotation angle.

For example, when the mechanical brake becomes ON at time τ21, the acceleration begins to decrease, and at time τ22, the acceleration becomes equal to or less than the threshold "−A1". Then, the measurement of the time t1 begins, and a state that the acceleration is equal to or less than the threshold "−A1" is kept until time τ23 at which the time t1 reaches T1. Therefore, at time τ23, the regeneration flag becomes ON.

After that, when the rider rotates the pedal, the pedal torque reaches the threshold B, although the pedal rotation angle does not reach the threshold C. In response to this event X at time τ24, OFF is set for the regeneration flag. After time τ24, the regeneration is stopped. Therefore, the acceleration increases.

However, because the rider uses the mechanical brake again at time τ25, the acceleration begins to decrease again, and the acceleration becomes equal to or less than the threshold "−A1" at time τ26. Then, the measurement of the time t1 is started again, and a state that the acceleration is equal to or less than "−A1" is kept until time τ27, at which the time t1 reaches T1. Therefore, at time τ27, the regeneration flag becomes ON again. After this, at time τ28, the functioning of the mechanical brake is stopped, and the acceleration increases.

However, before the acceleration becomes equal to or greater than threshold "−A2", the rider starts the pedal rotation at time τ29. In this example, the pedal torque is not detected, however, the pedal rotation is performed. Then, at time τ30, the pedal rotation angle reaches the threshold C. In response to the event Y at time τ30, OFF is set for the regeneration flag. After time τ30, the regeneration is stopped, therefore, the acceleration increases.

As described above, when the pedal torque becomes equal to or greater than the threshold B or when the pedal rotation angle becomes equal to or greater than the threshold C, the regeneration is stopped by setting OFF for the regeneration flag, because the rider's intention of the acceleration is detected. Accordingly, the regeneration control is performed along the rider's intention.

Embodiment 5

In addition to the rider's intention, there is a case where it is preferable to stop the regeneration according to the running state. In this embodiment, as one example, when the vehicle speed becomes equal to or less than the threshold D, the regeneration is also stopped because the motor-assisted bicycle 1 is stopped soon.

Figure 12:
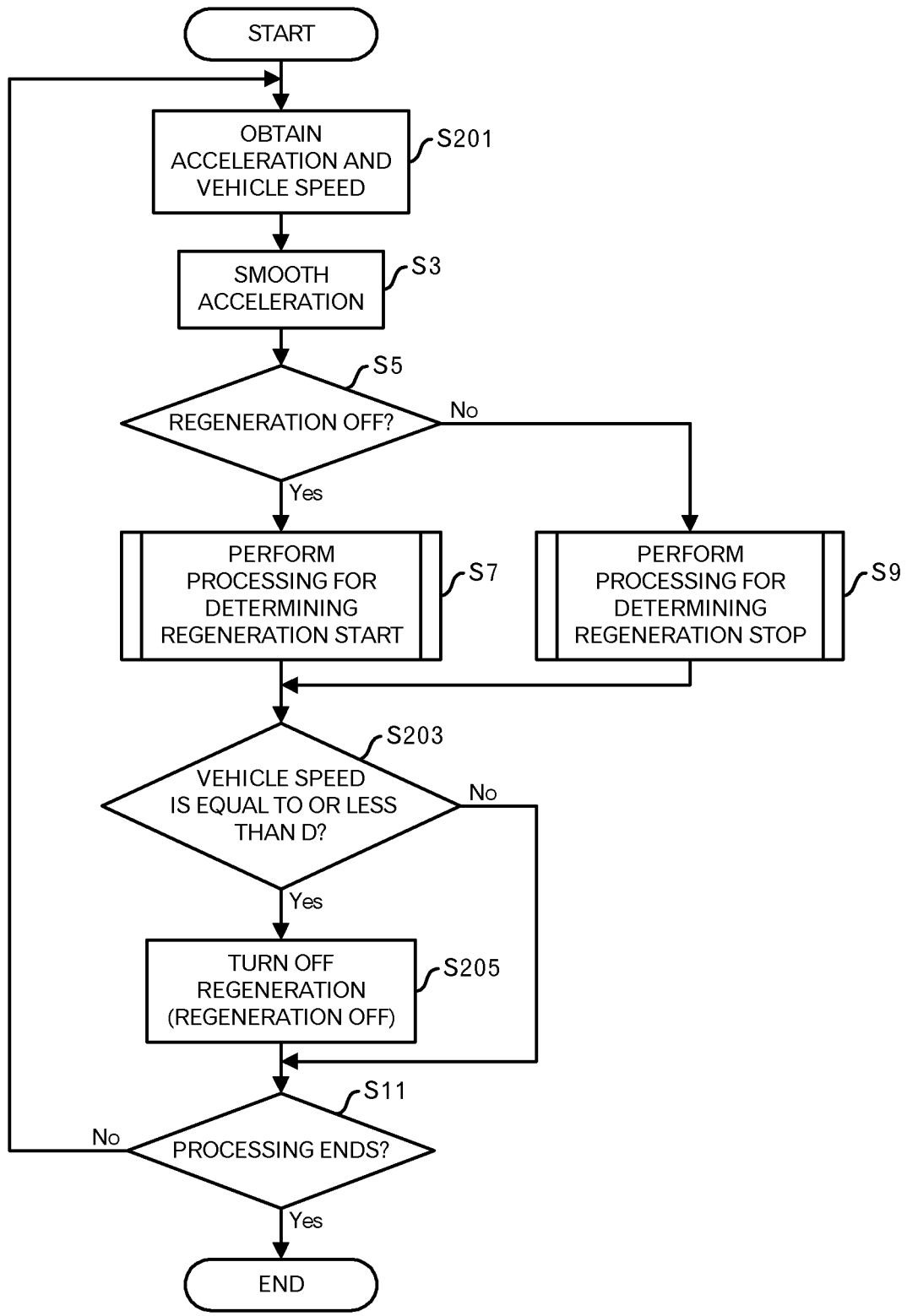
FIG. 12 is a diagram depicting a processing flow relating to a fifth embodiment.

FIG. 12 illustrates an operational flow of the controller relating to this embodiment. As for the same processing as the processing in FIG. 4, the same step number is assigned.

Firstly, the acceleration processing unit 3100 obtains the acceleration, and the automatic regeneration determination unit 3200 obtains the vehicle speed (step S201 in FIG. 12). The processing contents of the acceleration processing unit 3100 are the same as the step S1 in FIG. 4, therefore, the explanation is omitted.

The automatic regeneration determination unit 3200 obtains the motor speed from the motor speed input unit 1024 as the vehicle speed or obtains the speed from the acceleration/speed input unit 1023 when the speed sensor is provided.

Next, the acceleration processing unit 3100 performs the smoothing processing for the obtained acceleration, and outputs the smoothed acceleration to the automatic regeneration determination unit 3200 (step S3).

The automatic regeneration determination unit 3200 determines whether or not the regeneration is OFF now (namely, the regeneration flag is OFF) (step S5).

When the regeneration is OFF now, the automatic regeneration determination unit 3200 performs the processing for determining the regeneration start (step S7). The processing for determining the regeneration start is depicted in FIG. 5. After the processing for determining the regeneration start, the processing shifts to step S203.

On the other hand, when the regeneration is ON now (namely, the regeneration flag is ON), the automatic regeneration determination unit 3200 performs the processing for determining the regeneration stop (step S9). The processing for determining the regeneration stop is depicted in FIG. 6. After the processing for determining the regeneration stop, the processing shifts to the step S203.

The processing from the step S3 to the step S9 is the same as FIG. 4.

Then, the automatic regeneration determination unit 3200 determines whether or not the vehicle speed is equal to or less than the threshold D (step S203). It is determined whether or not the vehicle speed decreases enough.

When the vehicle speed exceeds the threshold D, the processing shifts to the step S11.

On the other hand, when the vehicle speed is equal to or less than the threshold D, the automatic regeneration determination unit 3200 sets the regeneration OFF (namely, sets OFF for the regeneration flag) (step S205). When the regeneration flag is OFF previously, the steps S203 to S205 may be skipped.

The aforementioned processing is repeated at intervals of a predetermined time period, until the power supply to the motor driving control apparatus 102 is stopped, for example, and the processing ends (step S11). In other words, when the processing does not end, the processing shifts to the step S201, and when the power supply is turned OFF, the processing ends.

By the aforementioned processing, when the speed of the motor-assisted bicycle 1 decreases sufficiently, it becomes possible to stop the regeneration.

Figure 13:
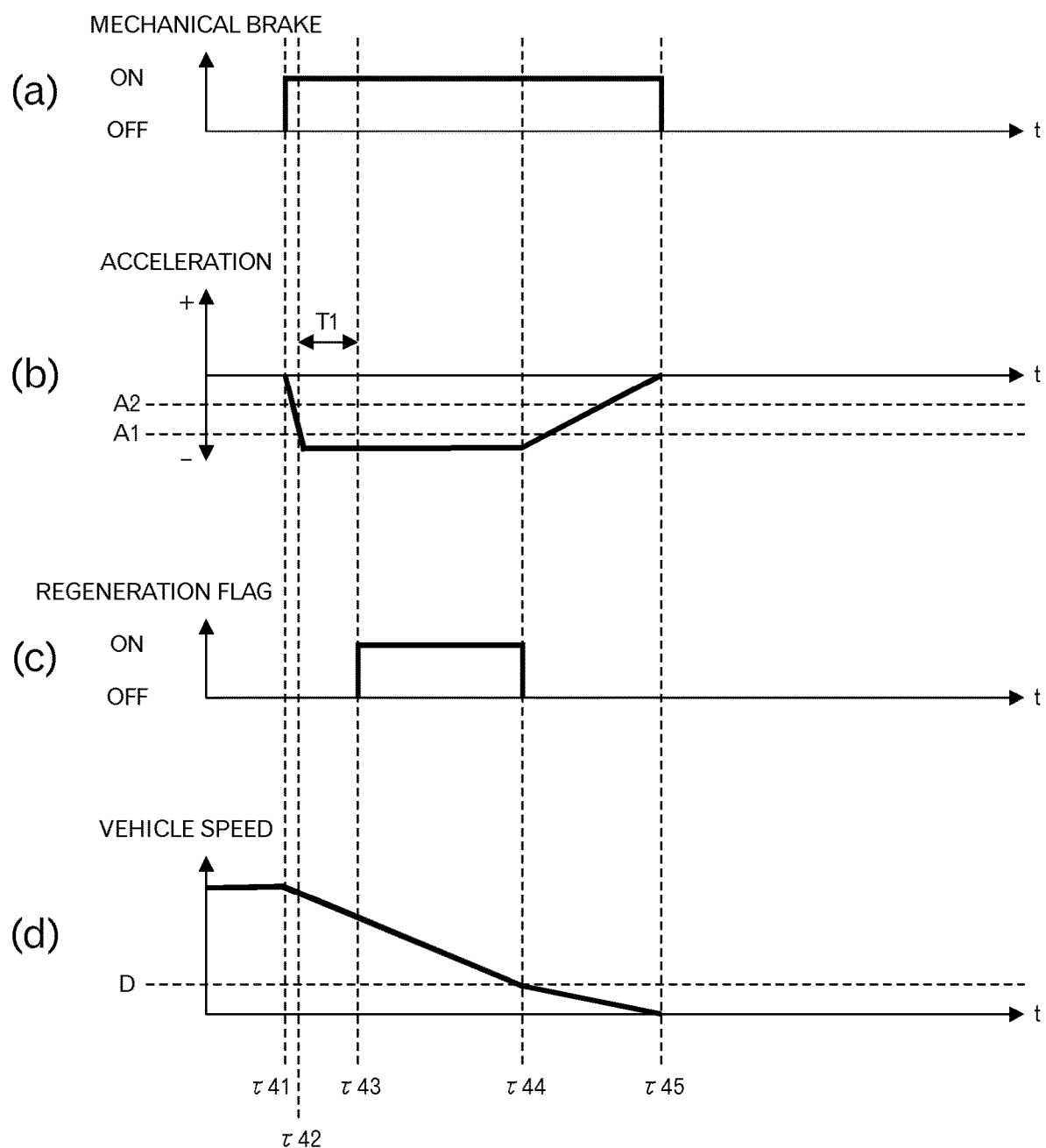
FIG. 13 is a time chart depicting an operational example relating to the fifth embodiment.

FIG. 13 depicts an operational example relating to this embodiment.

The vertical axis of FIG. 13 represents the time, (a) represents ON or OFF of the mechanical brake, (b) represents the smoothed acceleration, (c) represents ON or OFF of the regeneration flag and (d) represents the vehicle speed.

For example, when the mechanical brake becomes ON at time τ41, the acceleration begins to decrease, and at time τ42, the acceleration becomes equal to or less than the threshold "−A1". Then, the measurement of the time t1 is started, and a state that the acceleration is equal to or less than the threshold "−A1" is kept until time τ43, at which the time t1 reaches T1. Therefore, at time τ43, the regeneration flag becomes ON.

The vehicle speed also decreases from time τ41 to τ42, however, the decrease of the vehicle speed is not greater than the change of the acceleration. When a condition that the decrease of the vehicle speed is equal to or greater than a threshold is virtually set, the start timing of the regeneration might be delayed. Namely, because the regeneration does not begin easily, the charging amount could not be ensured sufficiently. On the other hand, by setting, as a determination reference, the acceleration itself that changes largely, the regeneration can be started soon, and it becomes possible to increase the charging amount. When the acceleration is used, the noise is a problem, however, by appropriately setting a condition for the continuation of the time period, using the smoothed acceleration and appropriately setting the threshold "−A1", it is resolved.

In this example, because the vehicle speed becomes equal to or less than the threshold D at time τ44, OFF is set for the regeneration flag at this timing. Then, the acceleration increases, however, the mechanical brake works. Therefore, the motor-assisted bicycle 1 is decelerated, then stopped.

Thus, when the motor-assisted bicycle 1 is decelerated sufficiently, it is possible to forcibly stop the regeneration.

Although the embodiments of this invention were explained above, this invention is not limited to those. According to a purpose to be achieved, any arbitrary technical feature may be deleted in the respective embodiments, and any arbitrary technical feature in other embodiments may be added.

Furthermore, the aforementioned functional block diagrams are mere examples, and one functional block may be divided into plural function blocks, or plural functional blocks may be integrated into one functional block. As for the processing flows, as long as the processing contents are not changed, the order of the steps may be changed, and plural steps may be executed in parallel.

A portion or entire of the computing unit 1021 may be implemented by dedicated circuits, or by executing programs prepared in advance, the aforementioned functions may be realized.

The kinds of sensors described above are mere examples, and other sensors that can obtain the aforementioned parameters may be employed.

Presuming the motor-assisted bicycle 1, the pedal torque and pedal rotation angle are employed above, however, as for the other kinds of mobile objects, other parameter to detect the user's intention of the acceleration are employed.

The aforementioned embodiments are summarized as follows:

A motor driving control apparatus relating to the embodiments includes (A) a driving unit (or inverter) configured to drive a motor; and (B) a controller configured to control the driving unit to perform regeneration when the acceleration of a vehicle on which the motor is embodied is negative and equal to or less than a predetermined value.

By focusing on the negative acceleration as described above, it becomes possible to start the automatic regeneration early. When the aforementioned predetermined value is a value based on the acceleration caused by the functioning of the mechanical brake, the regeneration can be started in response to the detection of the functioning of the mechanical brake.

In addition, the aforementioned controller may control the driving unit to perform the regeneration when a state that the acceleration of the vehicle speed is negative and equal to or less than the predetermined value continues for a first predetermined time period. By employing the aforementioned configuration, it is possible to easily remove the noise caused by the road state and the like.

Moreover, the aforementioned vehicle speed may be a smoothed value. The noise can be removed also by this smoothing.

Furthermore, after instructing the driving unit to perform the regeneration, the aforementioned controller may control the driving unit to stop or suppress the regeneration when a state that the acceleration of the vehicle is equal to or greater than a second threshold continues for a second predetermined time period. By employing the aforementioned configuration, the regeneration can be automatically stopped or suppressed. According to circumstances, the suppression may be employed instead of the stop. In addition, the gradual decrease may be employed. Moreover, the second time period may be shorter than the first predetermined time period. This is to stop or suppress the regeneration as soon as possible.

Moreover, the aforementioned controller may control the driving unit to start the regeneration after a third predetermined time period or gradually increase a regeneration amount, when a state that the vehicle acceleration is negative and equal to or less than the predetermined value continues for the first predetermined time period. It is possible to reduce the uncomfortable feeling or the like, which is affected for the driver by automatically starting the regeneration.

Furthermore, the aforementioned second predetermined value may be a value equal to or less than the acceleration caused when the driving unit performs the regeneration by the controller. This is to remove the influence on the acceleration when the regeneration is performed.

Furthermore, after instructing the driving unit to perform the regeneration, the aforementioned controller may control the driving unit to stop or suppress the regeneration when a user's intention of acceleration is detected or when a vehicle speed is equal to or less than a predetermined speed. This is to avoid a situation that the regeneration continues contrary to the intention of acceleration or the regeneration continues even after the deceleration is made sufficiently.

Moreover, the aforementioned intention of acceleration may be detected when a pedal rotation angle is equal to or greater than a predetermined angle or when a pedal torque is equal to or greater than a predetermined value. In case of the motor-assisted bicycle, this is because it is possible to detect the intention of acceleration when such states are detected.

Such configurations are not limited to matters described in the embodiments and may be implemented by other structures enabling substantially the same effects.

What is claimed is:

1. A motor driving control apparatus, comprising:
    an inverter configured to drive a motor; and
    a controller configured to control the inverter to start regeneration after lapse of a first time period since a second predetermined time period elapsed or gradually increase a regeneration amount, when a state that an acceleration of a vehicle on which the motor is embodied is negative and equal to or less than a first predetermined value continues for the second predetermined time period,
    wherein the controller controls the inverter to stop or suppress the regeneration when a state that the acceleration of the vehicle is equal to or greater than a second predetermined value continues for a third predetermined time period, after instructing the inverter to start the regeneration, and
    the second predetermined value is a negative value greater than the first predetermined value.

2. The motor driving control apparatus as set forth in claim 1, wherein the acceleration of the vehicle is a smoothed value.

3. The motor driving control apparatus as set forth in claim 1, wherein the second predetermined value is equal to or less than an acceleration that occurs when the inverter performs the regeneration.

4. The motor driving control apparatus as set forth in claim 1, wherein the controller controls the inverter to stop or suppress the regeneration when a user's intention of acceleration is detected or when a speed of the vehicle is equal to or less than a predetermined speed, after instructing the inverter to start the regeneration.

5. The motor driving control apparatus as set forth in claim 4, wherein the user's intention of acceleration is detected when a pedal rotation angle is equal to or greater than a predetermined angle or when a pedal torque is equal to or greater than a predetermined value.

6. The motor driving control apparatus as set forth in claim 1, wherein the first predetermined value is a value based on an acceleration, which is caused by functioning of a mechanical brake.

7. A motor-assisted vehicle, comprising:
    a motor driving control apparatus, including:
        an inverter configured to drive a motor; and
        a controller configured to control the inverter to start regeneration after lapse of a first time period since a second predetermined time period elapsed or gradually increase a regeneration amount, when a state that an acceleration of a vehicle on which the motor is embodied is negative and equal to or less than a first predetermined value continues for the second predetermined time period,
    wherein the controller controls the inverter to stop or suppress the regeneration when a state that the acceleration of the vehicle is equal to or greater than a second predetermined value continues for a third predetermined time period, after instructing the inverter to start the regeneration, and
    the second predetermined value is a negative value greater than the first predetermined value.

8. A regeneration control method, comprising:
    determining whether a state that an acceleration of a vehicle on which a motor is embodied is negative and equal to or less than a first predetermined value continues for a first predetermined time period;
    upon determining that the state continues for the first predetermined time period, controlling an inverter configured to drive the motor to start regeneration after lapse of a second time period elapsed since the first predetermined time period elapsed or gradually increase a regeneration amount;
    determining whether a second state that the acceleration is equal to or greater than a second predetermined value continues for a third predetermined time period after instructing the inverter to perform the regeneration; and
    upon determining that the second state continues for the third predetermined time period, controlling the inverter to stop or suppress the regeneration,
    wherein the second predetermined value is a negative value greater than the first predetermined value.

9. The regeneration control method as set forth in claim 8, wherein the second predetermined value is a value equal to or less than an acceleration that occurs when the inverter performs the regeneration.

* * * * *